Patented July 14, 1953

2,645,659

UNITED STATES PATENT OFFICE 2,645,659

SULFUR-CONTAINING ETHERS OF POLY-HYDRIC ALCOHOLS AND DERIVATIVES THEREOF

Rupert C. Morris and John L. Van Winkle, Berkeley, Calif., assignors to Shell Development Company, San Francisco, Calif., a corporation of Delaware No Drawing. Application August 29, 1949,
Serial No. 113,024

10 Claims. (Cl. 260—488)

This invention relates to a new class of organic sulfur-containing compounds. More particularly, the invention relates to sulfur-containing ethers of polyhydric alcohols and derivatives thereof, and to their utilization, particularly as plasticizers for organic compositions.

Specifically, the invention provides new and useful sulfur-containing ethers obtained by etherifying at least one hydroxyl group of a polyhydric alcohol, such as glycerol, with an alcohol containing at least one member of the group consisting of a thioether linkage, a sulfinyl radical and a sulfonyl radical joined to carbon atoms in an open-chain portion of its molecule. The invention further provides useful and valuable derivatives of the above-described sulfur-containing ethers obtained by reacting the said ethers with other compounds, such as organic acids and inorganic acids. The invention also provides organic compositions plasticized with the above-described novel compounds.

It is an object of the invention to provide a new class of organic compounds. It is a further object to provide novel organic sulfur-containing compounds possessing unique properties which make them particularly useful and valuable in industry. It is a further object to provide novel sulfur-containing ethers of polyhydric alcohols and a method for their preparation. It is a further object to provide valuable derivatives of the above-described sulfur-containing ethers. It is a further object to provide sulfur-containing compounds which are particularly valuable as plasticizers for organic compositions. It is a further object to provide plasticized vinyl-type polymers which possess many improved properties. Other objects and advantages of the invention will be apparent from the following detailed description thereof.

It has now been discovered that these and other objects may be accomplished by the sulfur-containing ethers obtained by etherifying at least one hydroxyl group of a polyhydric alcohol, such as glycerol, with a monohydric alcohol containing at least one member of the group consisting of a thioether linkage, a sulfinyl radical, and a sulfonyl radical joined to carbon atoms in an open-chain portion of its molecule, and derivatives of these sulfur-containing ethers obtained by reacting the said ethers containing free hydroxyl groups with other compounds, particularly the organic and inorganic acids. These novel compounds have been found to have many unexpected beneficial properties which make them particularly useful and valuable in industry. They are useful, for example, as non-ionic detergents, surface active agents, textile lubricants, lubricating oil additives, asphalt adhesive agents, water-proofing agents for silica-gel greases, pour point depressants, viscosity index improvers, and anti-foam agents. They are also valuable as softening agents and tackifiers for natural and synthetic organic polymeric material such as cellulose nitrate, cellulose acetate, and ethyl cellulose, the casein and other protein plastics, lignin plastics, synthetic linear polyamides, phenol-aldehyde type resins, urea-aldehyde type resins, and the like. The novel compounds, and particularly the organic acid ester derivatives, are especially valuable as plasticizers for the vinyl-type polymers, such as polyvinyl chloride, and when used in this capacity produced plasticized compositions possessing many outstanding beneficial properties.

The polyhydric alcohols used in producing the novel sulfur-containing ethers are alcohols containing at least two, and preferably three or more hydroxyl groups which are all attached to carbon atoms contained within a chain of aliphatic carbon atoms, preferably a chain of from 3 to 12 carbon atoms. Examples of these polyhydric alcohols are ethylene glycol, glycerol, glycerol monomethyl ether, glycerol monophenyl ether, 1,4-butanediol, 1,3,4-butanetriol, 1,4-butanediol, 1,3,5-hexanetriol, 1,5-pentanediol, 2-methyl-1,3-propanediol, 1,3,5-hexanetriol monomethyl ether, 1,5-hexadienediol, 2,2-dimethyl-1,3-propanediol, 3-methyl-1,3-butanediol, 2,3-pentanediol, 2,2-dimethyl-1,4-butanediol, 2,5-hexanediol, 1,4-octanediol, 2,3-dimethyl-2,3-butanediol, 1,5-decanediol, mannitol, pentaerythritol, dulcitol, and 1,4-cyclohexanediol.

The preferred polyhydric alcohols are alcohols containing from 3 to 4 hydroxyl groups attached to carbon atoms in an open-chain aliphatic hydrocarbon radical containing from 3 to 8 carbon atoms. Examples of the preferred alcohols are glycerol, 1,3,5-pentanediol, 1,2,4-heptanetriol, and 1,2,6-hexanetriol. Glycerol is the more preferred polyhydric alcohol to be used in the preparation of the ethers.

The sulfur-containing alcohols used to etherify the above-described polyhydric alcohols are monohydric alcohols containing at least one member of the group consisting of a thioether linkage, i. e., a —S— linkage, a sulfinyl radical, i. e., a —SO— radical, and a sulfonyl radical, i. e., a —SO$_2$— radical, joined to carbon atoms in an open-chain portion of their molecule, one of said linkages or radicals preferably being not more than six carbon atoms removed from the terminal hydroxyl group. The open-chain portion of the molecule containing the above-described linkages or radicals may be saturated or unsaturated and may be further substituted with aliphatic, alicyclic or aromatic radicals which in turn may be substituted with non-interfering substituents, such as halogen atoms, alkoxy radicals, and the like. Illustrative examples of these sulfur-containing alcohols are 3-amylthiopropanol, 4-hexylthiopentenol, 4-chloroethylthiobutanol, 2,4-dithiohexanol, i. e.

CH₃CH₂SCH₂SCH₂OH 4-allylthiopentenol, 3-dodecylthiopropanol, 5-octylthiohexenol, 3-benzylthiobutanol, 4-methallylthiopropanol, 3 - amylsulfinylpropanol, 3-hexylsulfinylpentenol, 4-octylsulfinylpentanol, 4-chlorobutylsulfinylbutenol, 3-cyclohexylsulfinylpropanol, 2,4-disulfonylhexanol, 2-sulfinyl-4-sulfonyloctanol, 3-phenylsulfonylpropanol, 2-thio-4-sulfonyloctanol, 5-tetradecylsulfonylheptenol, 4-cyclohexylsulfonylbutanol, and 3-benzylsulfinylpropanol.

Preferred sulfur-containing alcohols to be used in producing the novel ethers are the thio, sulfinyl or sulfonyl-substituted monohydric alcohols containing not more than 25 carbon atoms wherein from 1 to 3 non-adjacent methylene groups joined to carbon atoms in an open-chain portion of the alcohol molecule have been replaced by a thio ether linkage, a sulfinyl or sulfonyl radical. Examples of these preferred alcohols are 3-octylsulfinyldecanol, 3-decylsulfonyldodecanol, 2,4 - dithiohexanol, 2,5 - disulfonyltetradecanol, 2,4,8 - trithiotetradecanol, 3-phenylthiohexanol, 4-tetradecylsulfinylheptenol, 4 - octylsulfinylpentanol, 3 - amylsulfinyloctanol, 3 - cyclohexylsulfinylhexanol, and 4 - cyclohexenylsulfinylheptanol.

Particularly preferred sulfur-containing alcohols to be used in producing the novel ethers are the members of the group consisting of the hydrocarbothioalkanols, the hydrocarbosulfinylalkanols, and the hydrocarbosulfonylalkanols, the hydrocarbo radical in the said alcohols preferably containing from 2 to 12 carbon atoms and the bivalent hydrocarbon radical in the alkanol portion of the molecule preferably containing from 1 to 6 carbon atoms. Examples of this preferred group of alcohols are 4 - hexylthiopentanol, 3-decylsulfinylpropanol, 3-phenylsulfinylpropanol, 4 - cyclohexylsulfonylpropanol, 3 - amylthiopropanol, 3 - amylsulfinylpropanol, and 4-octylsulfonylbutanol.

Also coming under special consideration as preferred alcohols, particularly because of the ability of the resulting ethers to undergo addition polymerization with themselves or with other polymerizable unsaturated organic compounds to produce valuable resinous products, are the hydrocarbothioalkanols, hydrocarbosulfinylalkanols, and hydrocarbosulfonylalkanols wherein the hydrocarbo radical in the said alcohols is an unsaturated hydrocarbon radical containing at least one polymerizable ethylenic linkage. Examples of these preferred alcohols are 4 - allylthiopentanol, 3 - hexadienylsulfinylpropanol, 4 - methallylsulfonylpropanol, 3 - butadienylthiopropanol, and 4 - octadienylsulfonylbutanol.

A special group of the above-described alcohols, particularly when the resulting ethers are to be used as plasticizers for the vinyl-type polymers are the hydrocarbosulfonylalkanols. Vinyl-type polymers plasticized with ethers containing these alcohols possess exceptionally fine flexibility over a wide range of temperatures and good strength and heat stability.

The above-described thio alcohols may be prepared by any suitable method. They may be prepared by reacting an organic halide with a sulfhydryl-substituted alcohol, or alternatively by reacting a halo-substituted alcohol with a sulfhydryl-substituted organic compound, preferably in the presence of an alkali catalyst. They also may be prepared by reacting a sulfhydryl-substituted organic compound with a keto-alcohol or an aldehyde alcohol. The thio alcohols may also be prepared by reacting a sulfhydryl-substituted organic compound with an unsaturated alcohol, such as allyl alcohol, in the presence of an activating agent, such as ultraviolet light, peroxide catalysts or basic catalysts. A more detailed description of this latter method will be set forth hereinafter.

The above-described sulfinyl and sulfonyl alcohols may be prepared by any suitable method. They are preferably prepared by controlled oxidation of the thio alcohols. Complete oxidation of the thio group in these compounds produces the sulfonyl derivatives, while partial controlled oxidation produces the corresponding sulfinyl alcohols.

The oxidation of the thio alcohols may be effected by any of a large number of oxidizing agents, such as peroxides, as hydrogen peroxide, sodium and potassium perbenzoates, permanganates, bromides, fuming nitric acid, chromic acid, and perbenzoic acid. The amount of the oxidizing agent to be employed will vary over a considerable range. If the sulfinyl alcohol is the desired product it is generally desirable to react the thio alcohol with an approximate chemical equivalent amount of the oxidizing agent. As used throughout the specification the expression "chemical equivalent amount" refers to the amount of agent necessary to furnish one atom of oxygen for every thio ether linkage to be oxidized. Preferably, the thio alcohol and agent are reacted in chemical equivalent ratios of 1:1 to 1:1.5, respectively. If the sulfonyl alcohol is the desired product it is generally desirable to react the thio alcohol with at least twice the chemical equivalent amount of the oxidizing agent. Preferably, the alcohol and agent are reacted in chemical equivalent ratios of 1:2 to 1:2.5, respectively.

The oxidation may be accomplished in the presence or absence of solvents or diluents. Examples of suitable diluents are glacial acetic acid, benzene, toluene, xylene, and the like. The temperature employed during the oxidation may vary over a considerable range depending upon the reactants and oxidizing agent employed. It is generally desirable to maintain the temperature between 50° C. and 150° C., preferably 60° C. and 100° C. Cooling may be employed if necessary. Atmospheric, superatmospheric, or subatmospheric pressures may be employed as desired. The sulfinyl alcohols or sulfonyl alcohols formed in the reaction may be recovered by any suitable method, such as oxidation, distillation, fractional precipitation, and the like.

The novel sulfur-containing ethers of the invention may be obtained by etherifying one of the hydroxyl groups of any one of the above-described polyhydric alcohols with any one of the above-described sulfur-containing alcohols.

or they may be obtained by etherifying two or more of the hydroxyl groups of the polyhydric alcohols with the same or different sulfur-containing alcohols. Examples of the novel sulfur-containing ethers are glycerol alpha-(3-amylthiopropyl) ether, glycerol beta-(4-hexylsulfinylpropyl) ether, ethylene glycol 3-octylthiopropyl monoether, 1,3,5 - hexanetriol 1 - (3' - hexylsulfonylpropyl) ether, 1,4 - butanediol 3 - amylthiohexyl monoether, ethylene glycol 3 - butylthiobutyl monoether, glycol 2,4 - disulfonylhexyl monoether, 1,2,6 - hexanetriol 2 - thio - 4 - sulfonyloctyl monoether, glycol 4 - sulfonyl - 6-hydroxyhexyl monoether, glycerol alpha, beta-di(3 - isopropylthiooctyl) ether, glycerol beta-(4 - dodecylthiohexyl) ether, glycerol alpha-ethyl beta-(2-hexylsulfinylethyl) ether, glycerol (4-isooctylsulfonylpropyl) ether, 1,4-octanediol 1-(3'amylthiopropyl) ether, 1,3,5-hexanetriol 1,5-di(3'-phenylthiohexyl) ether, 1,5-pentanediol 4-cyclohexylsulfinylamyl ether, and glycerol alpha-(3-allylsulfonylhexenyl) ether.

Particularly preferred sulfur-containing ethers are those derived from glycerol and the above-described hydrocarbothioalkanols, hydrocarbosulfinylalkanols, and the hydrocarbosulfonylalkanols. Examples of these preferred sulfur-containing ethers are glycerol alpha-(3-amylthiopropyl) ether, glycerol alpha-(4-hexylthiobutyl) ether, glycerol alpha-(3-allylthiopropyl) ether, glycerol beta-(5-isopropylsulfonylhexyl) ether, glycerol alpha,beta-di(3-amylthiohexyl) ether, glycerol alpha-(3-dodecylsulfinyloctenyl) ether, glycerol alpha-(3-amylthiobutenyl) ether, and glycerol alpha,gamma - di(3 - amylthiobutenyl) ether.

The above-described sulfur-containing ethers may be prepared by any suitable method. One such method comprises reacting a halo-substituted derivative of either the polyhydric alcohol or the sulfur-containing alcohol with an alkali metal salt of the other reactant, i. e., the polyhydric alcohol or sulfur-containing alcohol. The glycerol sulfur-containing ethers may be prepared by this method, for example, by reacting glycerol monohalohydrin with sodium hydroxide and the sulfur-containing alcohol. The glycerol sulfur-containing ethers may also be prepared by reacting epihalohydrin with the desired sulfur-containing alcohol in the presence of catalyst, such as boron trifluoride and removing the remaining halogen atom by the conventional methods.

Another method and the more preferred one for producing many of the novel sulfur-containing ethers comprises adding a sulfhydryl-substituted organic compound to an unsaturated ether of the desired polyhydric alcohol in the presence of ultraviolet light, peroxide catalysts, or basic catalysts. Glycerol alpha-(3-amylthiopropyl) ether may be prepared by this method, for example, by reacting amyl-mercaptan with glycerol allyl ether in the presence of the above-described activating agents.

Sulfhydryl-substituted compounds that may be used in this preferred process may be exemplified by methyl mercaptan, ethyl mercaptan, butyl mercaptan, dodecyl mercaptan, cyclohexanethiol, thiophenyl, thionaphthol, and thiocresol. The unsaturated ethers of the desired polyhydric alcohols may be exemplified by glycerol allyl ether, glycerol diallyl ether, glycerol monomethallyl ether, 1,4-butanediol monoallyl ether, 1,8-octanediol diallyl ether and ethylene glycol monoallyl ether.

Light rays that may be employed for this reaction are preferably those having wave lengths between 1800 Angstroms and 7000 Angstroms, particularly those between 2000 and 5000 Angstroms. The peroxides that may be used as catalysts for this reaction may be exemplified by hydrogen peroxide, tertiary butyl hydroperoxide, acetyl peroxide, benzoyl peroxide and the like. The basic catalysts may be exemplified by sodium hydroxide, sodium ethylate, ammonia dibutyl amine, diethyl amine, and the like. The amount of the catalyst employed will vary over a considerable range depending upon the particular conditions but in most cases will vary between 0.1% to 3% by weight of the reactants.

The addition reaction may be accomplished in the presence or absence of solvents or diluents. If solvents or diluents are employed they should be organic compounds which are inert to this type of free radical reaction, such as benzene, toluene, xylene, and the like.

The amount of the unsaturated ether and sulfhydryl compound to be utilized in the reaction may vary over a considerable range. It is generally preferred to react the unsaturated ether with an excess of the desired mercaptan. Particularly preferred molar ratios of unsaturated ether to mercaptan vary from 1:1 to 1:2, respectively.

The temperature employed in the addition reaction may vary over a considerable range depending upon the reactants employed. In most cases the temperature will vary from about 80° C. to 200° C., with a preferred range varying from 90° C. to 160° C. Atmospheric, superatmospheric or subatmospheric pressures may be utilized.

The sulfur-containing ethers may be recovered from the reaction mixture by any suitable means, such as distillation, fractional precipitation, extraction, and the like.

The above-described addition process may also be used to produce the thio alcohols as described hereinabove.

As indicated, the novel sulfur-containing ethers possess many unusual properties which make them particularly valuable and useful in industry. They are especially valuable as non-ionic detergents, surface active agents, water-proofing agents for silica-gel greases, lubricating oil additives and as plasticizers and softeners for various natural and synthetic polymeric material.

The novel ethers may also be utilized as intermediates in the preparation of other useful and valuable derivatives. Many of the ethers, for example, will possess a free esterifiable hydroxyl group and may be reacted with acids, particularly the carboxylic acids, to produce valuable ester derivatives. Examples of acids that may be utilized for this purpose are phosphoric acid, hydrochloric acid, sulfuric acid, oxalic acid, acetic acid, butyric acid, lauric acid, capric acid, stearic acid, oleic acid, acrylic acid, methacrylic acid, benzoic acid, naphthoic acid, maleic acid, adipic acid, pimelic acid, sebacic acid, phthalic acid, 1,2,4-butanetricarboxylic acid, glutaconic acid, tetrachlorophthalic acid, and the like.

Particularly preferred derivatives are the esters of (1) the monoethers of glycerol and the above-described sulfur-containing alcohols and (2) acids of the group consisting of the monocarboxylic acids containing at least six carbon atoms, and polycarboxylic acids containing at least 3 carbon atoms. These particularly preferred ester derivatives have been found to be exceptionally fine plasticizers for the vinyl-type polymers.

Vinyl-type polymers plasticized with these ester derivatives as well as with the above-described group of glycerol ethers of hydrocarbosulfonylalkanols have excellent tensile strength and flexibility over a wide range of conditions and possess improved color and heat stability. These results were quite unexpected and it had been previously found that many other plasticizers containing ether groups had rather poor color and heat stability.

The ester derivatives of the above-described sulfur-containing ethers may be exemplified by glycerol alpha-(3-amylthiopropyl) ether beta,-gamma-diacetate, glycerol alpha-(3-hexylthiobutyl) ether beta,gamma-dibutyrate, ethylene glycol 3-octylthiopropyl monoether monoacetate, 1,3,5-hexanetriol 1-(3'-isopropylsulfonylpropyl) ether 3,5-dioctoate, 1,4-octanediol 1-(3'-chloroethylsulfinylpropyl) ether 4-caprate, glycerol alpha-(3-phenylthiooctyl) ether beta,gamma-dibenzoate, glycerol alpha,beta-di(3-butylsulfonylpropyl) diether gamma-monoheptoate, glycerol beta-(3-dodecylthiobutyl) ether alpha-monostearate, bis[glycerol alpha-(3-amylthiopropyl) ether beta-phenyl ether] succinate, glycerol alpha-(4-dodecylsulfinylhexyl) ether beta,gamma-diacrylate, bis[glycerol alpha-(4-octylsulfinylhexyl) ether beta-methyl ether] phthalate, and 1,5-pentanediol 3-bromo-butylsulfonylpropyl monoether monocyclohexanoate.

Examples of the particularly preferred group of ester derivatives are glycerol alpha-(3-amylthiopropyl) ether beta,gamma-di-2-ethylhexoate, glycerol alpha-(3-octylthiopropyl) ether beta,-gamma-dienanthate, glycerol beta-(3-phenylsulfonylpropyl) ether alpha,gamma-dilaurate, glycerol alpha-(5-hexylsulfinylhexyl) ether beta,-gamma-dimyristate, glycerol alpha-(3-heptylthiopropyl) ether beta,gamma-dipelargonate, bis[glycerol alpha-(3-octylthiopropyl) beta-methyl ether] succinate and glycerol alpha-(3-amylthiohexyl) beta-caproate gamma-laurate.

The ester derivatives may be prepared by any suitable method. They may be prepared for example, by direct esterification of the above-described sulfur-containing ethers in the presence of an esterification catalyst, by reacting the ethers with an acid chloride in pyridine, or by an ester-exchange reaction.

It is usually preferred, however, to prepare the esters by direction esterification. According to this method, the acids and sulfur-containing ethers are heated together and the water formed during the reaction is removed, preferably by distillation. Catalysts may be used in the direct esterification process if desired. Such catalysts may be exemplified by p-toluenesulfonic acid, ethylsulfonic acid, hydrobromic acid, chloroacetic acid, sulfuric acid, benzenesulfonic acid, formic acid, boron and silicon fluorides, acid salts, such as monosodium and monopotassium sulfates, and salts of strong acids and weak bases, such as aluminum sulfate, zinc chloride, zinc sulfate, and the like. The amont of the catalyst employed will vary over a wide range depending upon the particular type of reactants, catalyst, and reaction conditions employed. In most cases, the amount of catalyst will vary between 0.1% to 5% by weight of reactants. Preferred amounts of catalyst to be employed in the esterification process vary between 0.5% to 2% by weight of reactants.

The amount of acid and sulfur-containing ether to be added to the reaction mixture will vary over a considerable range depending upon the type of product desired. In general, at least one mole of acid should be utilized for every hydroxyl group to be esterified. Thus, if two of the hydroxyl groups of the ether molecule are to be esterified the said ether will preferably be reacted with a double molar quantity to slight excess, i. e., 10% to 20% excess, of the desired acids. The exact proportions of acids and ether to be utilized may be easily determined for each individual case.

The esterification may be accomplished in the presence or absence of solvents or diluents. In case the solvents or diluents are desired, inert organic compounds, such as benzene, toluene, cyclohexanone, and xylene, which do not interfere with the reaction may be used.

The temperature employed during the esterification may vary over a considerable range depending upon the type of reactants and catalysts to be employed. In most cases the temperature will range between about 40° C. and 250° C. with a preferred range being between 60° C. and 100° C. Higher or lower temperatures may be employed if desired or necessary.

In some cases it may be desirable to conduct the reaction in an inert atmosphere, such as nitrogen and carbon dioxide. Atmospheric, superatmospheric, or subatmospheric pressures may be used.

The separation of the esters formed in the reaction may be accomplished by any suitable means, such as extraction, distillation, fractional precipitation, and the like.

The vinyl-type polymers which may be plasticized by the above-described compounds are the homopolymers, copolymers and interpolymers of the vinyl-type monomers. The vinyl-type monomers include all those organic compounds containing at least one $CH_2=C<$ group in their molecule. Examples of the vinyl-type monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride, the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate.

A preferred group of vinyl-type polymers to be plasticized are the polymers of the halogen-containing vinyl-type monomers. Examples of this preferred group of polymers are polyvinyl chloride, polyvinyl bromide, polyvinylidene chloride, polyvinylidene bromide, copolymers of vinyl chloride and vinyl acetate, copolymers of vinyl chloride and vinylidene chloride, copolymers of allyl chloride and vinyl chloride, copolymers of vinylidene chloride and vinyl acetate, copolymers of vinyl chloride and methyl methacrylate, and the like.

Particularly preferred polymers to be plasticized are the vinyl halide polymers, such as polyvinyl chloride, polyvinyl bromide, copolymers of vinyl chloride and vinyl propionate, copolymers of vinyl bromide and methyl methacrylate, and the like.

A single compound may be used as the plasticizer or a mixture of two or more of the compounds may be utilized. In addition, the compounds may be used as plasticizer in combination with known plasticizers, such as dibutyl phthalate, dioctyl phthalate, tricresyl phosphate, and the like.

The amount of the plasticizer to be incorporated with the above-described vinyl-type polymers may vary over a considerable range depending upon the particular type of polymer to be utilized, the intended use of the compounded resins, etc. In most cases the amount of the plasticizer will vary from about 20 to 150 parts by weight for every 100 parts by weight of resin. A more preferred range comprises 40 parts to 75 parts by weight of plasticizer for every 100 parts by weight of resin.

Fillers and pigments such as whiting, channel black, clay, gum rosin, silica and others, and stabilizers, such as litharge, other lead compounds, some oxides of the bismuth and barium types and some silicates may also be added to the polymers along with the novel esters of the invention.

The vinyl-type resin compositions may be compounded by means of conventional equipment such as mills of the heated roll type or internal mixers. The plasticizer and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by conventional procedures.

To illustrate the manner in which the invention may be carried out the following examples are given. It is to be understood, however, that the examples are for the purpose of illustration and the invention is not to be regarded as limited to any of the specific conditions recited therein. Parts disclosed in the following examples are parts by weight.

*Example I*

About 165 parts of glycerol alpha-allyl ether and 251 parts of amyl mercaptan were placed in a flask equipped with a reflux condenser and mechanical stirrer. The mixture was rapidly stirred and irradiated with ultraviolet light at 100° C. to 135° C. for 22 hours. The reaction mixture was then distilled to produce glycerol alpha-(3-amylthiopropyl) ether, an oil boiling at 140–144° C. (at <1 mm.) and having the following physical properties: $d\ 20/4\ 1.0342$ and $h\ 20/d\ 1.4850$.

*Example II*

About 165 parts of glycerol alpha-allyl ether and 300 parts of octyl mercaptan are placed in a flask described in Example I. The mixture is then stirred and irradiated with ultraviolet light at a temperature between 100° C. and 150° C. At the completion of the reaction, the mixture is distilled to produce glycerol alpha-(3-octylthiopropyl) ether, a viscous liquid.

*Example III*

About 165 parts of glycerol alpha-allyl ether are reacted with 280 parts of thiophenol in the presence of ultraviolet light at a temperature between 100° C. and 135° C. At the completion of the reaction the mixture is distilled to produce glycerol alpha-(3-phenylthiopropyl) ether.

*Example IV*

About 130 parts of amyl mercaptan and 60 parts of allyl alcohol are placed in a flask described in Example I. The mixture is then stirred and irradiated with ultraviolet light at a temperature between 100° C. and 130° C. At the completion of the reaction the mixture is distilled to produce 3-amylthiopropanol.

75 parts of amylthiopropanol produced above are dissolved in 100 parts by volume of acetic acid and 100 parts of a 30% solution of hydrogen peroxide are added with stirring at such a rate as to keep the reaction mixture below 95° C., cooling being used if necessary. The reaction mixture is then distilled under 15 mm. pressure up to a bath temperature of 150° C. to remove acetic acid and water, the residue is distilled under reduced pressure to yield 3-amylsulfonylpropanol.

A mixture of about 190 parts of the 3-amylsulfonyl-propanol and about 60 parts of sodium hydroxide pellets in about 175 parts of dioxane is heated to about 95° C. and stirred for about one hour. Approximately 100 parts of glycerol alpha-monochlorohydrin are then added slowly and the reaction continued at a temperature of about 95° C. to 100° C. At the completion of the reaction the mixture is distilled to produce glycerol alpha - (3 - amylsulfonylpropyl) ether, a viscous liquid.

*Example V*

A portion of the 3-amylthiopropanol produced in Example IV is partially oxidized to form 3-amylsulfinylpropanol. A mixture of about 195 parts of the 3-amylsulfinylpropanol and 60 parts of sodium hydroxide pellets in about 175 parts of dioxane is heated to about 95° C. and stirred for one hour. About 100 parts of glycerol monochlorohydrin are then added slowly and the reaction continued at a temperature of about 100° C. At the completion of the reaction the mixture is distilled to produce glycerol alpha-(3-amylsulfinylpropyl) ether.

*Example VI*

About 100 parts of the glycerol alpha-(3-amylthiopropyl) ether produced in Example I, about 144 parts of 2-ethylhexoic acid and about 150 parts of toluene were placed in a kettle attached to a separating stillhead. The apparatus was swept out with carbon dioxide and 0.3 part of concentrated sulfuric acid was added. The mixture was then heated to reflux with a slow stream of carbon dioxide being passed through the reaction chamber. The water formed was removed by azeotropic distillation with the toluene. When no further water separated the reaction mixture was diluted with 2000 parts of benzene, treated with decolorizing charcoal, and then washed with water and dilute sodium carbonate. The resulting product was glycerol alpha-(3-amylthiopropyl) ether beta,gamma-di-2-ethylhexoate having the following physical properties: $d\ 20/4\ 0.9782$ and $h\ 20/d\ 1.4677$.

*Example VII*

About 100 parts of the glycerol alpha-(3-octylthiopropyl) ether produced in Example II, about 200 parts of caproic acid and 200 parts of toluene are placed in a kettle described in Example VI above. The apparatus is swept out with carbon dioxide and 0.2 part of concentrated sulfuric acid added. The mixture is then heated to reflux with a slow stream of carbon dioxide being passed through the reaction chamber. When no further water separated the reaction mixture is then diluted with 200 parts of benzene and the resulting mixture treated as in Example VII. The resulting product is glycerol alpha-(3-octylthiopropyl) ether beta,gamma-dicaproate.

*Example VIII*

About 100 parts of the glycerol alpha-(3-amylsulfonylpropyl) ether produced in Example IV are mixed with 260 parts of benzoyl chloride and 190 parts of benzene. 100 parts of dry pyridine are then added with cooling. The mixture is left at room temperature for about one-half hour and then heated on a water bath. The reaction mixture is then cooled and washed successively with water. After drying over anhydrous sodium sulfate the benzene is removed under reduced pressure and the residue distilled to produce glycerol alpha-(3-amylsulfonylpropyl) ether beta,gamma-dibenzoate.

*Example IX*

About 100 parts of the glycerol alpha-(3-amylsulfinylpropyl) ether produced in Example V, about 240 parts of pelargonic acid and 200 parts of benzene are placed in a kettle described in Example VI above. The apparatus is swept out with carbon dioxide and 0.2 part of concentrated sulfuric acid added. The mixture is then heated to reflux with a slow stream of carbon dioxide being passed through the reaction chamber. When no further water separated the reaction mixture is diluted and treated as in Example VII. Distillation of the mixture produced glycerol alpha-(3-amylsulfinylpropyl) ether beta,gamma-dipelargonate.

*Example X*

About 100 parts of polyvinyl chloride were compounded with 60 parts of glycerol alpha-(3-amylthiopropyl) ether beta,gamma-di-2-ethylhexoate produced in Example VI by mixing the two ingredients together with 2 parts (per 100 parts of polymer) of a trade stabilizer, milling the mixture together on a roll mill at a temperature between 130° C. and 150° C. and then molding the resulting sheets at 160° C. for two minutes. The resulting sheet possessed good tensile strength and flexibility over a wide range of conditions and showed excellent color and heat stability.

*Example XI*

About 100 parts of polyvinyl chloride are compounded with 50 parts of glycerol alpha-(3-amylsulfonylpropyl) ether beta,gamma-dibenzoate produced in Example VIII by the process shown in the preceding example. The resulting sheet possesses good tensile strength and flexibility over a wide range of conditions and possesses good heat stability.

*Example XII*

About 100 parts of a copolymer of 95% vinyl chloride and 5% vinyl acetate are compounded with 50 parts of glycerol alpha-(3-amylsulfinylpropyl) ether beta,gamma-dipelargonate by the process shown in Example X. The resulting sheet possesses good tensile strength and flexibility and possesses good color and heat stability.

*Example XIII*

About 100 parts of polyvinyl chloride are compounded with 60 parts of glycerol alpha-(3-amylsulfonylpropyl) ether by the process shown in Example X. The resulting sheet possesses good strength and flexibility over a wide range of temperatures and possesses good color and heat stability.

We claim as our invention:
1. Glycerol alpha-(3-amylthiopropyl) ether.
2. Glycerol alpha-(3-amylthiopropyl) ether beta,gamma-di-2-ethylhexoate.
3. Glycerol alpha-(3-amylsulfonylpropyl) ether.
4. Glycerol alpha-(3-amylsulfonylpropyl) ether beta,gamma-di-2-ethylhexoate.
5. A glycerol alpha-(alkylthioalkyl) ether.
6. A glycerol alpha-(alkenylthioalkyl) ether.
7. A glycerol alpha-(hydrocarbothioalkyl) ether.
8. An alpha-(alkylthioalkyl) ether of an alkanetriol wherein the said alkanetriol contains from 3 to 8 carbon atoms.
9. An alpha-(alkylsulfonylalkyl) ether of an alkanetriol wherein the said alkanetriol contains from 3 to 8 carbon atoms.
10. A compound of the group consisting of alpha-(hydrocarbothioalkyl) ethers of aliphatic open-chain polyhydric alcohols containing from 2 to 4 hydroxyl groups and no more than 12 carbon atoms, alpha-(hydrocarbosulfinylalkyl) ethers of aliphatic open-chain polyhydric alcohols containing from 2 to 4 hydroxyl groups and no more than 12 carbon atoms, alpha-(hydrocarbosulfonylalkyl) ethers of aliphatic open-chain polyhydric alcohols containing from 2 to 4 hydroxyl groups and no more than 12 carbon atoms, esters of the aforedescribed alpha ethers containings at least one free esterifiable hydroxyl group and aliphatic monocarboxylic acids containing at least six carbon atoms, and esters of the aforedescribed alpha-ethers containing at least one free esterifiable hydroxyl group and polycarboxylic acids containing at least 3 carbon atoms.

RUPERT C. MORRIS.
JOHN L. VAN WINKLE.

References Cited in the file of this patent

UNITED STATES PATENTS

| Number | Name | Date |
| --- | --- | --- |
| 2,163,180 | Ufer | June 20, 1939 |
| 2,446,464 | Evans | Aug. 3, 1948 |
| 2,470,948 | Paul | May 24, 1949 |
| 2,497,100 | Snyder et al. | Feb. 14, 1950 |
| 2,570,050 | Eby | Oct. 2, 1951 |

OTHER REFERENCES

Sjoberg Ber. Chem., vol. 75B, pages 13–26 (1942).